UNITED STATES PATENT OFFICE.

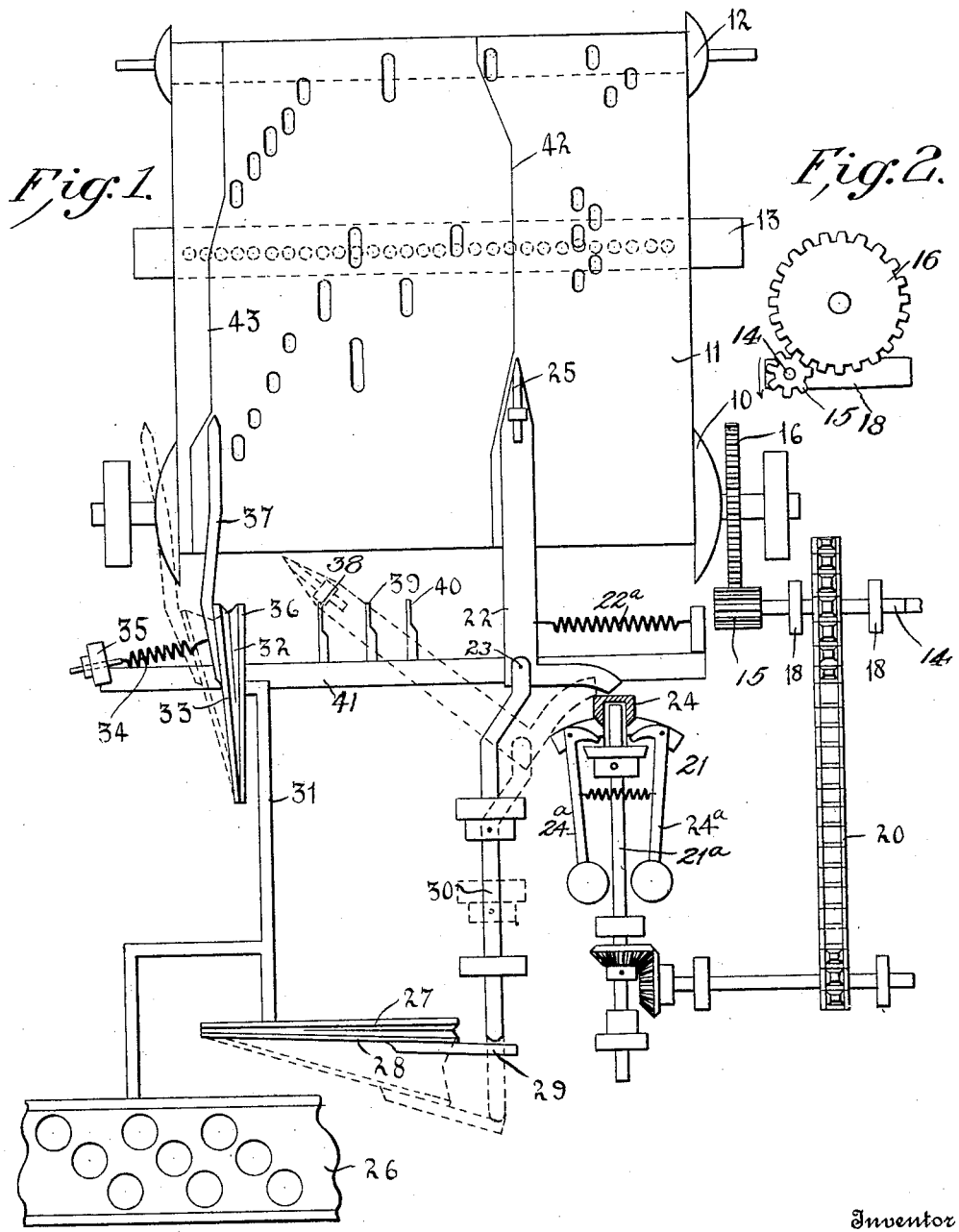

SAMUEL S. WATERS, OF WASHINGTON, DISTRICT OF COLUMBIA.

RECORDING AND INDICATING DEVICE FOR MUSICAL INSTRUMENTS.

1,103,553. Specification of Letters Patent. Patented July 14, 1914.

Application filed April 30, 1910. Serial No. 558,604.

*To all whom it may concern:*

Be it known that I, SAMUEL S. WATERS, a citizen of the United States, residing at Washington, in the District of Columbia, have invented new and useful Improvements in Recording and Indicating Devices for Musical Instruments, of which the following is a specification.

My invention relates to recording and indicating devices for use in connection with musical instruments, and has particular reference to such devices for use in connection with self-playing musical instruments, in which control of the instrument is accomplished by the passage of a record sheet or its equivalent over a tracker board. Such musical instruments are usually pneumatically operated. While my device is especially adapted for use in the relation stated, however, it may be given a number of different forms, and may be adapted thereby for use in connection with the other types of musical instruments.

I have directed my efforts to the production of a recording and indicating device which will record or indicate automatically the expression, the tempo, and other effects, produced on a musical instrument. That I have produced such a device will be apparent from a reading of the description herein. The effects once automatically recorded on a standard record sheet by a person playing the instrument, may be reproduced by other persons by simple and easy manipulation of the instrument to cause the device to repeat the previously recorded effects.

In the accomplishment of my invention I employ indicators automatically operative independently of manual movement to indicate the several effects produced. Thus is indicated the loud and soft pedal effects, caused by variations in pressure; also the time, which corresponds with the speed of the record sheet. The indications are quantitative, since the effects are directly related to the causes controlling them. Thus I employ a speed indicator having a traveling member which moves automatically with the changeable speed of the record sheet for indicating tempo or time, and a pressure indicator automatically movable as the pressure varies for indicating expression, etc. I associate these indicators with each other and with the standard record sheet of the instrument in a manner to cause them to trace on the record sheet, guiding lines and thereafter to indicate by said guiding lines, the relation of the effects being produced as compared with those recorded. By manual control the effects may be adjusted until the indications correspond exactly with those of the record sheet. Thus the average operator may reproduce music having the expression of the great masters.

In the accompanying drawings I have shown one embodiment of my invention.

Of the drawings,—Figure 1 is a diagrammatic lay out of the mechanism of my invention, and Fig. 2 is a detail of the driving means for the record sheet of the automatic musical instrument.

Referring to these drawings 10 designates the take-up roll of the driving mechanism for a perforated sheet record of a commonly known pneumatically operated self-playing piano. A perforated record sheet 11 is shown being taken up on this roll, and being unwound as it is taken up from the record roll 12. The record sheet 11 passes over the tracker board 13 with which it coöperates, and through which the instrument is controlled by means of the perforations in the sheet as usual. The take-up roll 10 and the music roll 12 are rotated to perform their several functions by any of the mechanisms now employed and which are well known to those skilled in the art. Their use being so common and no claim to the same being made herein such mechanisms have not been illustrated in detail, sufficient mechanism only being shown in connection with the take-up roll to indicate the means for driving the speed indicator. This mechanism comprises a shaft 14 positively driven on which is a pinion 15 engaging a gear wheel 16 on the shaft of the take-up roll. The rotation of the shaft 14 will of course drive the take-up roll, said shaft being movable endwise or transversely a sufficient distance when necessary to disengage the pinion 15 from the gear wheel 16, so that when the music roll 12 is positively driven to rewind the music sheet the take-up roll will be disconnected from its operating mechanism and be permitted to rotate freely. This being a common means in the art for winding and rewinding the music sheet, further mention thereof will be unnecessary.

A speed indicator 21 placed adjacent the record sheet and as shown, comprises a revoluble shaft 21ᵃ driven from the shaft 14 by sprocket and chain 20 or other gearing. A longitudinally sliding member 24 is mounted on said shaft to rotate therewith on which member is pivoted a pair of weighted swinging arms 24ᵃ that fly away from the shaft 21ᵃ as the latter rotates and slides the member 24 on said shaft in well-known manner. An indicating pointer 22 controlled by the movement of the member 24 is carried on a shifting pivot 23 about which it is adapted to rock. The pointer 23 is shown in the form of a right-angled lever, the pivot 23 passing through the angle from which radiates a short arm held in engagement with the member 24 by a spring 22ᵃ and a long arm projecting from the record sheet and carrying a pencil or other marker 25 on its nut.

Instead of the means hereinabove described for operating the pointer, any other form of device driven from the shaft 14 and adapted to impart a variable movement to the pointer may be employed.

Connected with the valve-box 26 of the instrument is a pneumatic 27 which when playing is collapsed, as shown, but which upon relief of pressure in the valve box upon the cessation of playing is expanded as shown in dotted lines. Extended outwardly from the end of the movable member 28 of the pneumatic is a projection 29 adapted to engage a rod 30, which carries the shiftable pivot of the indicating element of the speed indicator. Also connected to the valve box 26 by a conduit 31 is a pneumatic 32, the movable element 33 of which is tensioned by a spring 34 adjustably connected at one end to a fixed support 35. The tension of this spring is such that the movable member 33 moves back and forth toward and from the fixed member 36 in response to variations of pressure within the valve box 26. Connected to the movable member is a pointer 37, which is a pneumatic pressure indicator and is so positioned that the pointer 37, like the pointer 22 of the speed indicator, normally moves back and forth over the face of the record sheet 11.

Control levers 38, 39 and 40 are shown diagrammatically over a key bed 41. By means of these levers, the expression, tempo, and other effects can be easily controlled, there being one of these levers for the control of each effect to be produced.

The operation of my invention is as follows: Assuming first that the standard record lines of the effects to be reproduced are to be traced upon a record sheet, each pointer is equipped with a pencil 25 bearing upon the face of the record sheet, and the instrument is manipulated by means of the control levers 38 to 40 to cause the machine to produce the effects desired. As these effects are produced, the speed indicator moves its pointer 22 over the face of the record sheet to make a record line of speed, this line corresponding to the tempo or time of the music as it is played. This line 42 becomes a standard record line of the speed. The record sheet being thus played, other record lines may be placed upon other record sheets by aid of this originally made record sheet, considered as a pattern or guide. Likewise the pressure indicator moves its pointer 37 back and forth forming a line 43 constituting a standard record line of expression, and of the intensity of the individual notes or portions of the music played. This record line like the speed record line may be transferred to other sheets without going through the operation of producing them for each individual sheet. Assuming now that it is desired to play the selection and give it the same expression as was given it by the person who made the standard record, the record sheet bearing the standard record is placed in an instrument equipped with the mechanism of my invention, and the operator, while playing, so moves the control levers 38 and 40 as to cause the pointers 37 and 22 respectively, of the pressure and speed indicators, to follow at all times the standard record lines 43 and 42. The pointers at all times indicate with respect to the standard record lines 42 and 43, the speed, pressure or other effects being produced, and it is a simple matter for even an inexperienced party to so manipulate the control levers as to cause the pointer to follow the record lines. When it is desired to rewind the record sheet, in the normal operation the exhaust is cut off from the valve box 26, and the rotation of the shaft 14 is stopped. Immediately the exhaust is cut off from the valve box 26, the pneumatic 27 expands and the pivot 23 of the pointer 22 of the speed indicator moves, carrying the pointer 22 to the left and downwardly and clear of the music roll and away from the face of the record sheet. Likewise the expansion of the pneumatic 32 of the pressure indicator by means of the spring 34 when the exhaust is cut off, causes it to draw the pointer 37 so far to the left as to remove it from the face of the record sheet. Thus the rewinding operation may be carried out without any interference from the pointers. Of course the recording pencils 25 are preferably adjusted or removed so that they do not bear upon the record sheet during the reproduction of any selection according to the previously made standard record line of expression. Preferably in the standard player piano as now produced these pencils are omitted entirely and the pointers 22 and 37 are so constructed as to move free from the sheet, but at the same time to keep in proximity to the lines of record to secure accuracy.

What I claim is,—

1. The combination in a self-playing musical instrument, of a movable record sheet, mechanism for feeding said record sheet, manually actuated means for varying the feed of said feeding mechanism, and a speed indicator driven by said feed mechanism and variably movable therewith, said speed indicator being provided with a member movable over the record sheet as the speed of said feeding mechanism varies.

2. The combination in a self-playing musical instrument, of a movable record sheet, mechanism for feeding said record sheet, manually actuated means for varying the speed of said feeding mechanism, a speed indicator driven by said feeding mechanism and variably movable therewith, said speed indicator being provided with a swinging member movable over the record sheet as the speed of said feeding means varies, a shifting support for said pointer, and means actuated by the same power that actuates the playing mechanism for moving said support to withdraw the pointer from the record sheet when said power ceases to be operative.

3. The combination in a self-playing musical instrument, of a movable record sheet, mechanism for feeding said record sheet, manually actuated means for varying the speed of said feeding mechanism, a speed indicator driven by said feeding mechanism and variably movable therewith, said speed indicator comprising a rectilinearly movable member and a vibrating member in the form of an angular lever one arm of which is in operative engagement with said rectilinearly movable member and the other arm movable over the record sheet as the speed of the feeding mechanism varies.

4. The combination in a self-playing musical instrument, of a movable record sheet, mechanism for feeding said record sheet, manually actuated means for varying the speed of said feeding mechanism, a speed indicator driven by said feeding mechanism and variable therewith, said speed indicator including a rectilinearly movable member and a swinging member in the form of an angular lever one arm of which is in operative engagement with said rectilinearly movable member and the other arm movable over said record sheet as the speed of the feeding mechanism varies, a shifting support on which said pointer is pivoted, and means actuated by the same power that actuates the playing mechanism for moving said support to withdraw the pointer from the record sheet when said power ceases to be operative.

5. In a self-playing musical instrument, the combination of a music record sheet provided with a marking representing a standard speed at which said record sheet is to be fed, mechanism for feeding said record sheet, means for changing the speed of said mechanism and a speed indicator driven by said record sheet feeding mechanism and provided with means for indicating, relatively to the speed marking on said record sheet, the speed at which said record sheet is being fed.

6. In a self-playing musical instrument, the combination of a record sheet, feeding means for said record sheet, an automatic speed indicator driven by said feeding means and provided with a member to indicate automatically on the face of said record sheet the speed at which said sheet is being fed, a source of air pressure for the musical instrument, and a pneumatic actuated by said air pressure for holding said indicating member over the record sheet, said member automatically moving from said sheet when the pressure in said pneumatic becomes normal.

7. In a self-playing musical instrument, the combination of a record sheet, mechanism for feeding the same, an automatic speed indicator connected with said mechanism and provided with a member to indicate on the face of said record sheet the speed at which said sheet is being fed, a source of air pressure for the musical instrument, means actuated by said air pressure for holding said member in active position over the record sheet when playing, and means for automatically rendering inactive said indicator member upon the stoppage of movement of said record sheet, and a reduction of air pressure.

8. In a self-playing musical instrument the combination of a record sheet, mechanism for feeding said record sheet, an automatic speed indicator operatively connected with said mechanism and provided with a vibrating member to indicate automatically on the face of said record sheet the speed at which said record sheet is being fed, a source of air pressure for operating the musical instrument in response to the movement of said record sheet, and a pneumatically operated device connected to said source of air pressure and to the vibrating member of said speed indicator for the purpose of rendering inactive said vibrating member when the source of air pressure becomes unable to actuate the instrument.

9. In an automatic musical instrument, the combination of a record sheet, means for feeding same, a source of air pressure for operating the instrument in response to movements of said sheet, an automatic speed indicator driven by the sheet feeding means, a swinging lever forming a part of said speed indicator adapted to traverse the face of the sheet and indicate by its position the variations in speed of said sheet feeding means, and pneumatically operated means supporting said lever when the instrument is in operation and automatically withdrawing said swinging lever entirely from in front of said sheet when the air pressure becomes weakened to a predetermined extent.

10. In an automatic musical instrument, the combination of a record sheet for controlling said instrument, means for feeding said record sheet, an automatic speed indicator connected with said record sheet feeding mechanism, a swinging pointer forming a part of said speed indicator overlying said record sheet and indicating by its position the speed at which said record sheet is being fed, a source of air pressure for operating said instrument in response to the movement of said record sheet by said feeding mechanism, a support whereon said pointer is pivoted to swing, and means controlled by said air pressure for moving said support to automatically carry said lever above the record sheet when the same is to be operated, and away from the record sheet at the conclusion of playing and the cessation of air pressure.

11. The combination in a self-playing musical instrument, of a movable record sheet, mechanism operated by fluid pressure for feeding said record sheet, manually actuated means for changing the fluid pressure and varying the speed of said feeding mechanism, a speed indicator driven by said feeding mechanism and variably movable therewith, a pointer forming a part of said speed indicator movable over the record sheet as the speed of the feeding means varies, a shifting support for said pointer, and means actuated by the fluid pressure for moving said support in one direction to hold the pointer over the record sheet and in the opposite direction to withdraw the same from said record sheet.

In testimony whereof I have hereunto set my hand in presence of two subscribing witnesses.

SAMUEL S. WATERS.

Witnesses:
S. C. HILL,
H. BERGMANN.

Copies of this patent may be obtained for five cents each, by addressing the "Commissioner of Patents, Washington, D. C."